(12) United States Patent
Gallant et al.

(10) Patent No.: US 7,933,331 B2
(45) Date of Patent: *Apr. 26, 2011

(54) HIGH QUALITY, LOW MEMORY BANDWIDTH MOTION ESTIMATION PROCESSOR

(75) Inventors: Michael D. Gallant, Kitchener (CA); Eric C. Pearson, Conestogo (CA)

(73) Assignee: LSI Corporation, Milpitas, CA (US)

( * ) Notice: Subject to any disclaimer, the term of this patent is extended or adjusted under 35 U.S.C. 154(b) by 7 days.

This patent is subject to a terminal disclaimer.

(21) Appl. No.: 12/237,741

(22) Filed: Sep. 25, 2008

(65) Prior Publication Data

US 2009/0022223 A1   Jan. 22, 2009

Related U.S. Application Data

(63) Continuation of application No. 10/714,712, filed on Nov. 17, 2003, now Pat. No. 7,453,940.

(60) Provisional application No. 60/487,643, filed on Jul. 15, 2003.

(51) Int. Cl.
  H04N 7/28 (2006.01)
  H04N 7/36 (2006.01)
  H04N 7/48 (2006.01)
  H04N 7/50 (2006.01)

(52) U.S. Cl. .......... 375/240.14; 375/240.12; 375/240.16

(58) Field of Classification Search ............ 375/240.12, 375/240.14, 240.16
See application file for complete search history.

(56) References Cited

U.S. PATENT DOCUMENTS

| 5,155,593 | A |   | 10/1992 | Yonemitsu et al. ........... 358/133 |
| 5,608,656 | A |   | 3/1997  | Purcell et al. ............. 364/514 R |
| 5,635,994 | A | * | 6/1997  | Drexler et al. ................ 348/699 |
| 5,657,087 | A |   | 8/1997  | Jeong et al. .............. 375/240.16 |
| 5,706,059 | A |   | 1/1998  | Ran et al. ................. 375/240.16 |

(Continued)

FOREIGN PATENT DOCUMENTS

EP   961499 A1   12/1999

(Continued)

OTHER PUBLICATIONS

Sheu-Chich Cheng et al., "A Comparison of Block-Matching Algorithms Mapped to Systolic-Array Implementation", IEEE Transactions on Circuits and Systems for Video Technology, vol. 7, No. 5, Oct. 1997, pp. 741-757.

(Continued)

*Primary Examiner* — Joseph G Ustaris
*Assistant Examiner* — David N Werner
(74) *Attorney, Agent, or Firm* — Christopher P. Maiorana, PC

(57) ABSTRACT

An apparatus generally having a first circuit and a second circuit is disclosed. The first circuit may be configured to (i) copy a plurality of first reference samples of a first reference image from an external memory, the first reference samples being proximate a first position within the first reference image and (ii) generate a first motion vector corresponding to a first current block of a current image by searching among the first reference samples. The second circuit may be configured to (i) copy a plurality of second reference samples of the first reference image from the external memory, the second reference samples being (a) proximate a second position within the first reference image and (b) non-adjacent the first reference samples and (ii) generate a second motion vector corresponding to the first current block by searching among the second reference samples.

21 Claims, 6 Drawing Sheets

U.S. PATENT DOCUMENTS

| | | | | |
|---|---|---|---|---|
| 5,731,840 | A | 3/1998 | Kikuchi et al. | 348/416 |
| 5,739,872 | A * | 4/1998 | Kim et al. | 348/699 |
| 6,108,039 | A | 8/2000 | Linzer et al. | 348/398 |
| 6,108,040 | A | 8/2000 | Moteki et al. | 375/240.16 |
| 6,215,822 | B1 | 4/2001 | Bose et al. | 375/240.16 |
| 6,272,179 | B1 | 8/2001 | Kadono | 375/240.16 |
| 6,359,929 | B1 | 3/2002 | Boon | 375/240.16 |
| 6,380,986 | B1 | 4/2002 | Minami et al. | |
| 6,445,645 | B2 | 9/2002 | Arcoleo et al. | 365/233 |
| 6,456,660 | B1 | 9/2002 | Yokoyama | 375/240.16 |
| 6,473,460 | B1 | 10/2002 | Topper | 375/240.16 |
| 6,563,874 | B1 | 5/2003 | Lu | 375/240.12 |
| 6,765,965 | B1 | 7/2004 | Hanami et al. | 375/240.16 |
| 6,985,527 | B2 | 1/2006 | Gunter et al. | 375/240.16 |
| 7,072,399 | B2 | 7/2006 | Winger et al. | 375/240.16 |
| 7,106,800 | B2 | 9/2006 | Yoneyama | 375/240.26 |
| 7,453,940 | B2 * | 11/2008 | Gallant et al. | 375/240.14 |
| 2001/0014124 | A1 | 8/2001 | Nishikawa | 375/240.16 |
| 2002/0176500 | A1 | 11/2002 | Bakhmutsky et al. | 375/240.13 |
| 2002/0191846 | A1 * | 12/2002 | Crinon et al. | 382/173 |
| 2003/0063673 | A1 | 4/2003 | Riemens et al. | 375/240.16 |
| 2003/0072373 | A1 * | 4/2003 | Sun | 375/240.16 |
| 2003/0174776 | A1 * | 9/2003 | Shimizu et al. | 375/240.16 |

FOREIGN PATENT DOCUMENTS

| | | |
|---|---|---|
| EP | 1143712 A2 * | 10/2001 |
| JP | 2000-308064 | 2/2000 |

OTHER PUBLICATIONS

Eiji Ogura et al., "A 1.2-W Single-Chip MPEG2 MP@ML Video Encoder LSI Including Wide Search Range (H:±288, V:±96) Motion Estimation and 81-MPOS Controller", IEEE Journal of Solid-State Circuits, vol. 33, No. 11, Nov. 1998, pp. 1765-1771.

* cited by examiner

HIGH QUALITY, LOW MEMORY BANDWIDTH MOTION ESTIMATION PROCESSOR

CROSS REFERENCE TO RELATED APPLICATIONS

This application is a continuation of U.S. Ser. No. 10/714,712, filed Nov. 17, 2003, now U.S. Pat. No. 7,453,940, which is hereby incorporated by reference in its entirety.

This application claims the benefit of U.S. Provisional Application No. 60/487,643, filed Jul. 15, 2003, which is hereby incorporated by reference in its entirety.

This application is related to co-pending application Ser. No. 10/196,731, filed Jul. 16, 2002, now U.S. Pat. No. 7,072,399, Ser. No. 10/669,930, filed Sep. 24, 2003, now U.S. Pat. No. 7,342,964, Ser. No. 10/682,631, filed Oct. 9, 2003 and Ser. No. 10/690,884, filed Oct. 22, 2003, now U.S. Pat. No. 7,324,596, which are hereby incorporated by reference in their entirety.

FIELD OF THE INVENTION

The present invention relates to a video motion estimation generally and, more particularly, to a high quality, low memory bandwidth motion estimation processor.

BACKGROUND OF THE INVENTION

Designing a motion estimation approach for a very large scale integration implementation that yields high picture quality (i.e., DVD quality) while consuming very low external memory bandwidth poses several challenges. Using a large search area for the motion estimation yields high picture quality but uses very high external memory bandwidth and large internal buffers. Using a small search area for the motion estimation results in reduced external memory bandwidth, but produces additional controls, buffering and yields low picture quality, especially in the presence of fast motion. To counter the fast motion, each target macroblock can be searched in a small, localized area. However, little or no overlap exists between localized search areas for each target macroblock, or group of macroblocks, in a worst case scenario. Thus, very high external memory bandwidth is still consumed reading reference data for each small search areas.

A first approach for motion estimation is to encode with a regular search method using small motion estimation search areas. However, the first approach suffers from a picture quality loss. A second approach is to encode with the regular search method using large motion estimation search areas. Consequences for using the large search areas include high external memory bandwidth, a large internal memory buffer and large computational complexity. A third approach is to encode with "fast" search methods that use fewer data points (i.e., fewer calculations per search location and/or fewer search locations) and small motion estimation search areas. The fewer data points result in a moderate external memory bandwidth usage but produce a picture quality loss while adding complexity in the forms of additional control and buffering. A fourth approach is to encode with "fast" search methods and large motion estimation search area. The large search areas consume a high external memory bandwidth, large internal memory buffers and produce additional control and buffering.

SUMMARY OF THE INVENTION

The present invention generally concerns an apparatus having a first circuit and a second circuit. The first circuit may be configured to (i) copy a plurality of first reference samples of a first reference image from an external memory, the first reference samples being proximate a first position within the first reference image and (ii) generate a first motion vector corresponding to a first current block of a current image by searching among the first reference samples. The second circuit may be configured to (i) copy a plurality of second reference samples of the first reference image from the external memory, the second reference samples being (a) proximate a second position within the first reference image and (b) non-adjacent the first reference samples and (ii) generate a second motion vector corresponding to the first current block by searching among the second reference samples.

The objects, features and advantages of the present invention include providing an apparatus and/or method for high quality, low memory bandwidth motion estimation that may (i) minimize search memory size, (ii) minimize external memory bandwidth consumption, (iii) maintains a regular data from the external memory, (iv) utilize relatively low complexity control hardware, (v) maintain a reasonably large effective search area and/or (vi) ensure high picture quality.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

The present invention may realize the benefits of a large search area without using high external memory bandwidth by using two small independent "boxcar" search windows. Each search window size may be set to +/−40, 32, 24 or 16 horizontal (H) integer pels by +/−24, 16 or 8 vertical (V) integer pels. Each search window may be placed within a reference frame independently of each other (e.g., each with an individual (x, y) offset). When no large motion is detected in a sequence of video frames, the search windows may be placed adjacent or adjoining each other horizontally or vertically. When fast motion is detected, one of the windows may be placed near a center of a target current macroblock to capture static background and small motion while the other search window may be placed at an appropriate position to cover the large motion. The positioning, or offsets, are generally determined once per frame. Other update rates for the offsets may be implemented to meet the criteria of a particular application. Many methods may be used to determine suitable offsets, including analyzing a history of motion vectors and/or analyzing a results of a sub-sampled search on the current frame. A number of different techniques may be used for the analysis (e.g., histograms, clustering, etc.).

Figure 1:
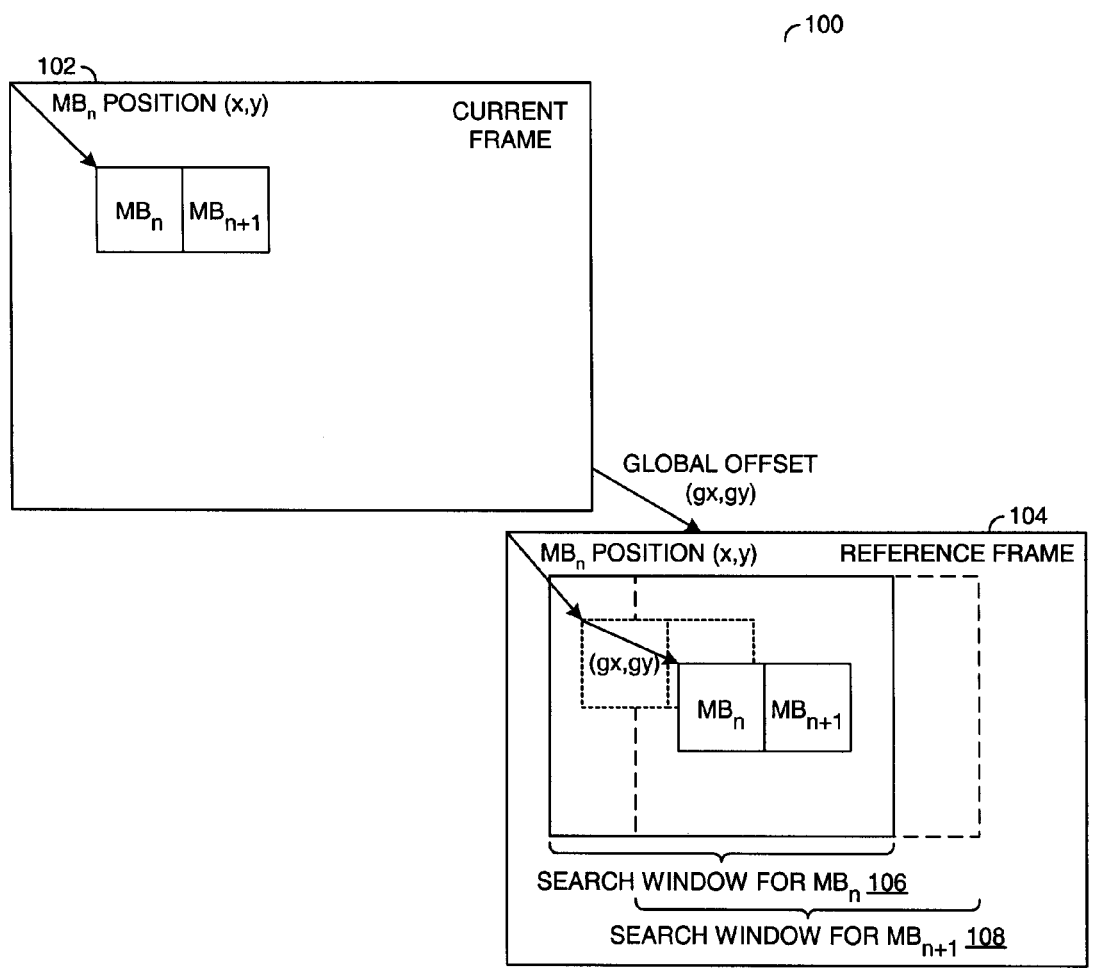
FIG. 1 is a block diagram relating example current macroblocks to reference search windows.

Referring to FIG. 1, a block diagram 100 relating example current macroblocks to reference search windows is shown. A motion estimation may be performed by comparing blocks of current samples in a current frame 102 against reference samples in a reference frame 104. Search areas in the reference frame 104 may be determined by a position of each current block relative to a reference corner (e.g., upper left corner) of the current frame 102 and a global offset (e.g., (gx, gy)) between the current frame 102 and the reference frame 104. Details for how to determine one or more global offsets (gx, gy) may be found in the co-pending U.S. application Ser. No. 10/196,731, filed Jul. 16, 2002, hereby incorporated by reference in its entirety.

Use of boxcar search windows to determine a search area may be illustrated by way of example as follows. A first current block (e.g., MBn) may be located at a location or position (e.g., (x, y)) relative to the reference corner of the current frame 102. An adjoining or second current block (e.g., MBn+1) may be located immediately to the right of the first current block MBn. A first search area or window 106 for the first current block MBn in the reference frame 104 may be calculated by adding the position vector (x, y) to the global offset vector (gx, gy) (e.g., (x+gx, y+gy)). Since the second current block MBn+1 is next to the first current block MBn in the current frame 102, a good probability generally exists that a best match for the second current block MBn+1 may be found in a second search area or window 108 offset slightly to the right from the first search window 106. Generally, the offset may be a horizontal distance equal to a horizontal size of the current blocks (e.g., 16 pels). Other offsets (e.g., horizontal and/or vertical) of the second search window 108 from the first search window 106 may be implemented to meet the criteria of a particular application.

Figure 2:
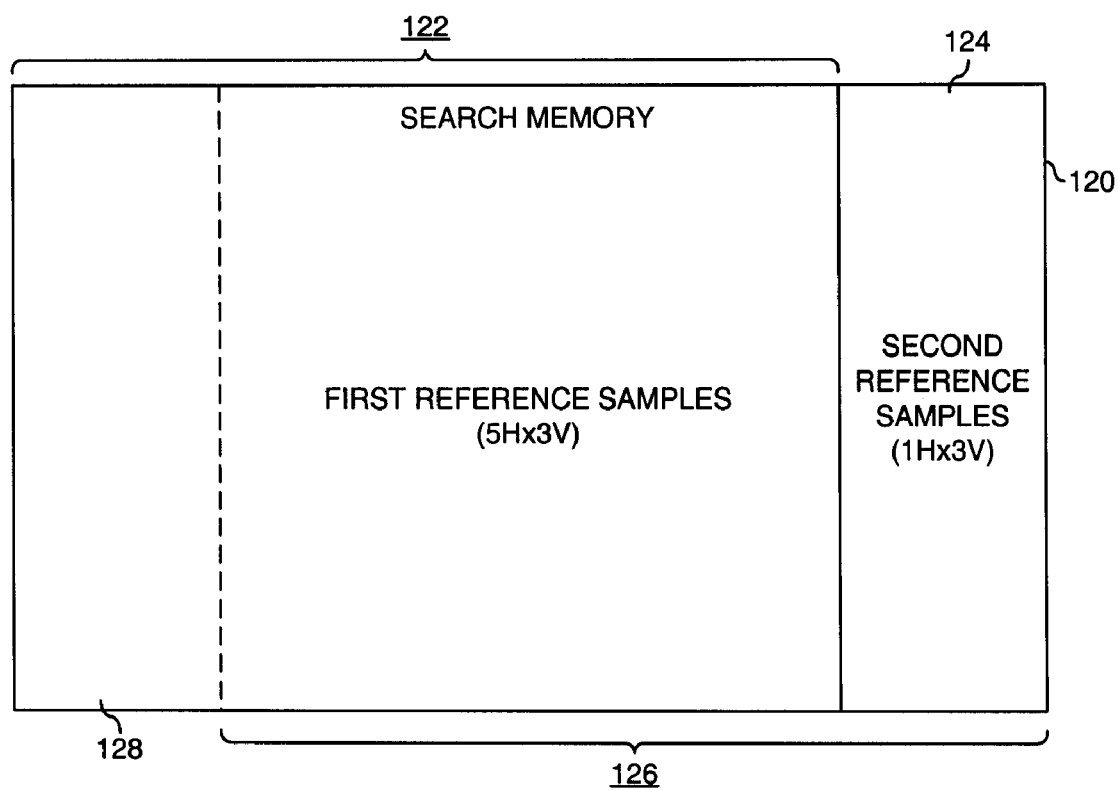
FIG. 2 is a block diagram of an example utilization of a search memory.

Referring to FIG. 2, a block diagram of an example utilization of a search memory 120 is shown. Keeping the global offset (gx, gy) constant during multiple searches throughout the current frame 102 generally allows exploitation of (i) a small memory 120 (or internal buffer) for motion estimation circuitry, (ii) a maximization of data reuse for reference samples already copied into the search memory 120 and (iii) a minimization of external memory bandwidth to copy the reference samples from an external memory. The search memory 120 may contain storage for an array of reference blocks (e.g., 6H×3V to 8H×3V reference blocks) or an array of reference samples (e.g., 96H×48V to 128H×48V pels at 16H×16V pels per block) over which a search may be performed.

The search memory 120 may be logically partitioned to allow different phases for multiple searches to be performed substantially simultaneously. For example, the first search window 106 for the first block MBn may be stored as an array (e.g., 5H×3V) of reference blocks, as illustrated by area 122. A macroblock column 124 (e.g., 1H×3V to 1H×1V array) of reference blocks may be copied from the external memory to load data from the second search window 108 for the second current block MBn+1 while the first current macroblock MBn is searched using the area 122 of the search window data.

As the motion vector search for the first current block MBn is ending, another macroblock column 128 may start to load in the search memory 120 overwriting the reference samples in the area 122 no longer useful to the search. After the first search has completed, a new motion vector search for the second current block MBn+1 may begin using the reference data stored in an area 126. The area 126 may contain the reference samples from the second search window 108. The area 126 generally comprises a portion (e.g., 4H×3V blocks) of the reference samples common to the first search window 106 and the second search window 108 plus the macroblock column 124 of reference samples within the second search window 108 but outside the first search window 106. In general, each successive search area for neighboring macroblocks may overlap the previous search areas. Each new target current macroblock may be searched by loading only a single new macroblock column (e.g., 16H×48/32/16V pels) to the search window 120 from the reference frame 104. Loading a single macroblock column instead of an entire search window generally helps to minimize the external memory bandwidth consumed by the motion estimation process.

Figure 3:
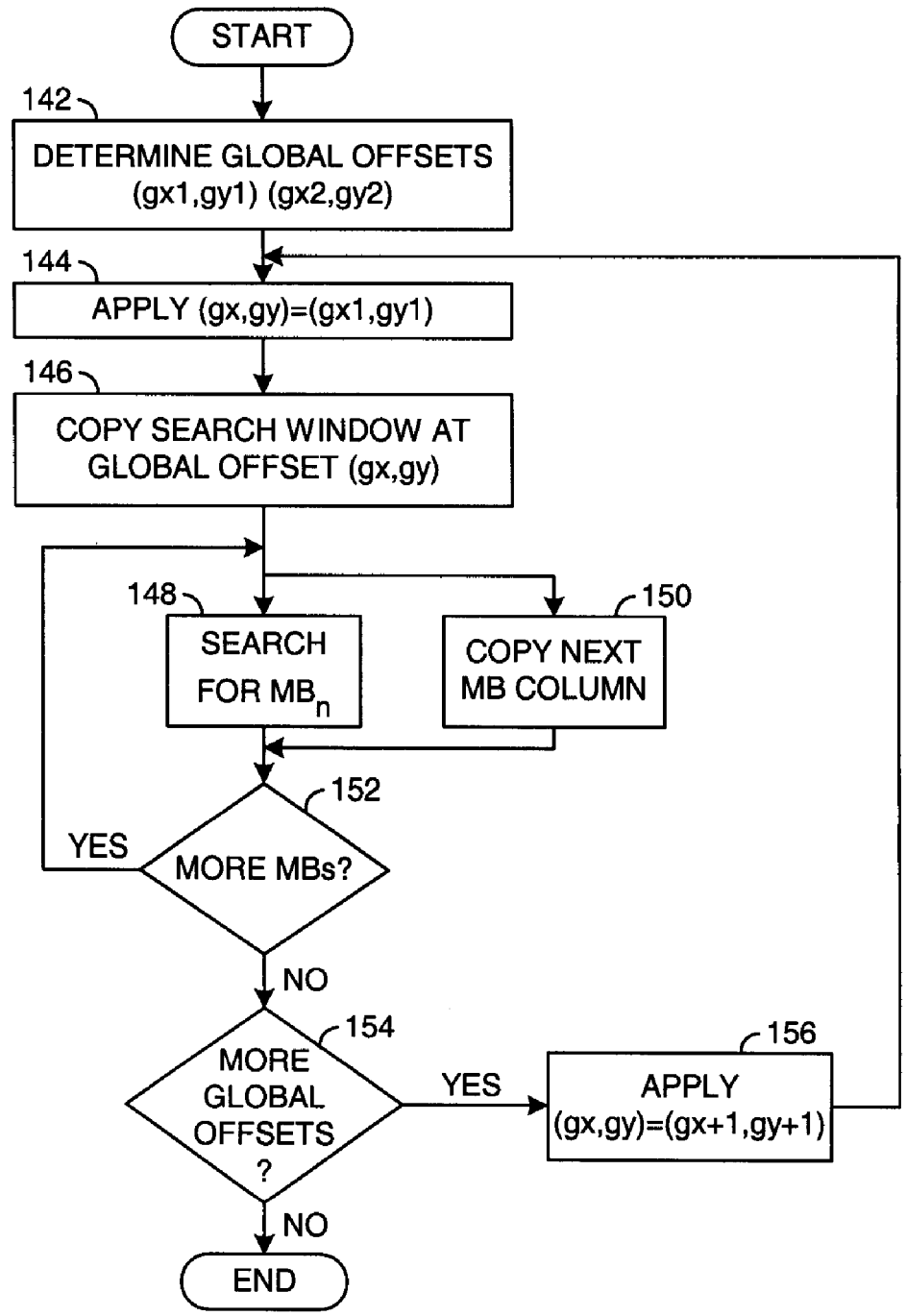
FIG. 3 is a flow diagram of an example method for motion estimation.

Referring to FIG. 3, a flow diagram of an example method 140 for motion estimation is shown. The method (or process) 140 generally includes determining a first global offset (e.g., gx1, gy1) and a second global offset (e.g., gx2, gy2) (e.g., block 142). The first global offset (gx1, gy1) may be applied (e.g., block 144). The first search window 108 within the reference frame 104 may then be copied from the external memory to the search memory 120 using the first global offset (gx1, gy1) (e.g., 146). The motion estimation circuitry may then begin searching for a first motion vector for the first current block MBn (e.g., block 148). While the first search is being performed, the new macroblock column 124 within the reference frame 104 may be coped into the search memory 120 substantially simultaneously (e.g., block 150). A check may be made (e.g., decision block 152) to determine if any additional current blocks have not been searched. If the second current block MBn+1, or any other current block, has not been searched (e.g., the YES branch from decision block 152), the process may return to the search task 148 and begin the copy task 150 to load a next macroblock column from the reference frame 104, if any.

Once motion vectors have been determined for all of the current blocks in the current frame 102 (e.g., the NO branch of decision block 152), a check may be performed for additional global offsets (e.g., decision block 154). If additional global offsets (e.g., (gx2, gy2)) exist (e.g., the YES branch of decision block 154), another search of the current blocks in the current frame 102 may be performed with the new global offset (e.g., block 156). After all of the global offsets have been examined (e.g., the NO branch of decision block 156), the search process 140 may be ended.

Figure 4:
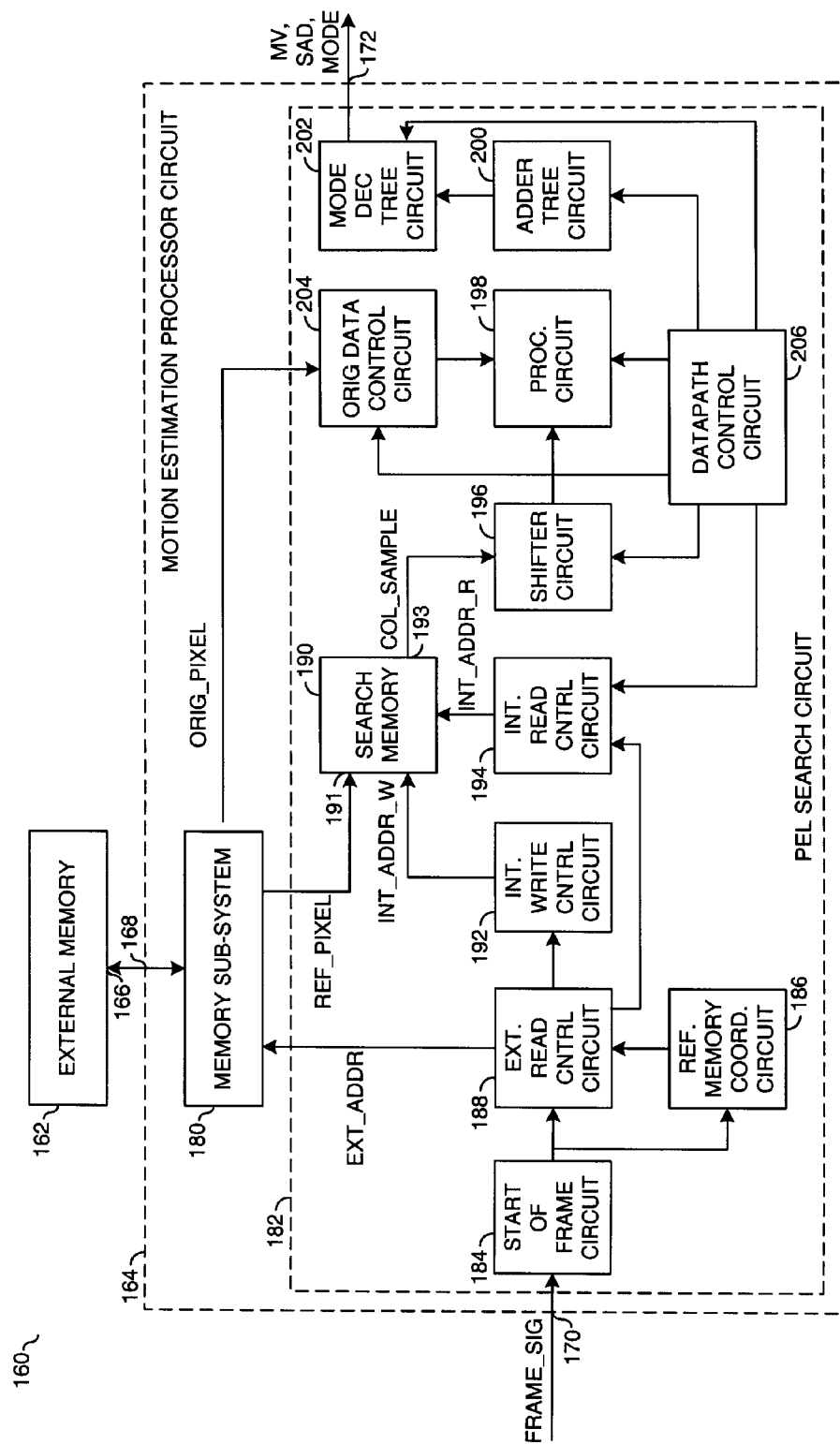
FIG. 4 is a partial block diagram of a first example implementation of an apparatus in accordance with a preferred embodiment of the present invention.

Referring to FIG. 4, a partial block diagram of an example implementation of an apparatus (or system) 160 is shown in accordance with a preferred embodiment of the present invention. The apparatus 160 generally comprises a memory circuit 162 and a circuit (or module) 164. The memory circuit 162 may have an interface 166 coupled to an interface 168 of the circuit 164. The circuit 164 may receive framing signals (e.g., FRAME_SIG) at an interface 170. The circuit 164 may present multiple signals (e.g., MV, SAD and MODE) at an interface 172.

The circuit 164 may be implemented as a motion estimation (ME) processor circuit. The ME processor circuit 164 is generally fabricated as a single integrated circuit. The memory circuit 162 may be fabricated on another integrated circuit independently from the ME processor circuit 164. As such, the memory circuit 162 may be referred to as an external memory circuit.

The signal FRAME_SIG generally comprises multiple signals used to determine a start of a current frame for which the motion estimation is to be performed. The signal FRAME_SIG may include, but is not limited to, horizontal synchronization information, vertical synchronization information, a frame height, a frame width and a macroblock start indication. Other information may be included in the signal FRAME_SIG to meet the criteria of a particular application.

The signal MV may define one or more motion vectors for the current block (e.g., MBn, MBn+1, etc.) with respect to a reference frame or frames at an integer-pel resolution. The number of motion vectors within the signal MV may be defined by a particular partition mode determined to be a best mode for the current block. For example, if the apparatus 100 determines that a MODE0 should be used for motion estimation, the signal MV may convey a single motion vector for the current block. If the apparatus 100 determines that a MODE3 should be used for motion estimation, the signal MV may convey four motion vectors, one for each of the four sub-blocks within the current block.

The signal SAD may define a sum of absolute difference value for the best mode determined by the apparatus 100. The signal SAD may include a bias value and/or a cost value incorporated before determining the best mode. The bias value and the cost value may be determined from quantization parameters and the motion vectors.

The signal MODE may define the particular partition mode resulting in the best motion estimation for the current block. The signal MODE may identify seven different modes in designs of the apparatus 160 that may be capable of partitioning each of the current blocks into sixteen smallest sub-blocks. The signal MODE may identify four different modes in designs of the apparatus 160 that may be capable of partitioning each of the current blocks into four 8×8 sub-blocks. Other numbers of modes may be implemented to meet the criteria of a particular application.

The motion estimation processor circuit 164 generally comprises a circuit (or module) 180 and a circuit (or module) 182. The circuit 180 may be implemented as a memory sub-system circuit. The memory sub-system circuit 180 may be configured to communicate with the external memory 162.

The circuit 182 may be implemented as a pel search circuit. The pel search circuit 182 may communicate with the external memory circuit 162 through the memory sub-system circuit 180 to receive the current blocks on which the motion estimation is to be performed. A signal (e.g., ORIG_PIXEL) may transfer the current blocks. The pel search circuit 182 may also receive reference samples stored in the external memory circuit 162 via the memory sub-system circuit 180. A signal (e.g. REF_PIXEL) may transfer the reference samples. A signal (e.g., EXT_ADDR) may be generated by the pel search circuit 182 to read the current and reference information from the external memory circuit 162.

The signal REF_PIXEL may transfer reference frames that have been previously encoded and then decoded. The frames may represent one or more pictures used for the motion estimation. Each frame generally comprises multiple reference blocks. Each reference block may be implemented as a macroblock. The reference blocks may be arranged in a single or integer-pel resolution.

The signal ORIG_PIXEL may transfer current frames to be encoded. Each current frame generally comprises multiple current blocks for which motion estimation may be performed. Each current block may be implemented as a macroblock.

The pel search circuit 182 may be operational to determine one or more motion vectors for a current block of video data. The pel search circuit 182 may perform a variable block size motion estimation at an integer-pel resolution to determine a best partition mode and associated motion vector or motion vectors. The pel search circuit 182 generally searches all integer positions for all block-sizes within a search window. Based on integer scores, the pel search circuit 182 may identify the block size that produces the minimum sum of absolute difference score. Additional details of the pel search circuit 182 may be found in the related U.S. patent application Ser. No. 10/669,930, filed Sep. 24, 2003, now U.S. Pat. No. 7,342,964, Ser. No. 10/682,631, filed Oct. 9, 2003 and Ser. No. 10/690,884, filed Oct. 22, 2003, now U.S. Pat. No. 7,324,596, which are hereby incorporated by reference in their entirety.

The ME processor circuit 182 generally comprises a circuit (or module) 184, a circuit (or module) 186, a circuit (or module) 188, a memory circuit (or module) 190, a circuit (or module) 192, a circuit (or module) 194, a circuit (or module) 196, a circuit (or module) 198, a circuit (or module) 200, a circuit (or module) 202, a circuit (or module) 204 and a circuit (or module) 206. The circuit 184 may receive the signal FRAME_SIG. The circuit 188 may generate the address signal EXT_ADDR. The memory circuit 190 may receive the signal REF_PIXEL. The circuit 204 may receive the signal ORIG_PIXEL. The circuit 202 may generate the signals Mv, SAD and MODE.

The circuit 184 may be referred to as a start to frame circuit. The start of frame circuit 184 may be operational to determine when a new current frame begins based on the signal FRAME_SIG. The start of from circuit 184 may communicate a detected start of frame to the circuits 186 and 188.

The circuit 186 may be referred to as a reference memory coordinate calculation circuit. The reference memory coordinate calculation circuit 186 may be operational to direct reads from the external memory circuit 162 based on information received from the start of frame circuit 184. The reference memory coordinate calculation circuit 186 may calculate an X and a Y position of a macroblock column to be fetched from the external reference memory 162. Calculations of the X and the Y coordinates may be based on a global offset (gx, gy) and search width. For every X coordinate, multiple (e.g., three) Y coordinates may be calculated, one for each reference block in the macroblock column. For a macroblock row, the X coordinate generally changes every macroblock cycle and the Y coordinate change upon completion of a macroblock row.

The circuit 188 may be referred to as an external read control circuit. The external read control circuit 188 generally generates the address in the signal EXT_ADDR and associated control signals to read the macroblock column samples from the external memory circuit 162. The external read control circuit 188 may be configured to provide either a single address for a macroblock column or separates addresses for each block within the macroblock column.

The memory circuit 190 may be implemented as an internal search (or reference) memory circuit. The internal search memory circuit 190 may be operational to store reference samples copied from the external memory circuit 162 for use in the motion estimation process. The reference samples may be received by the internal search memory circuit 190 through the signal REF_PIXEL at a write port 191. The reference samples may be provided to the circuit 196 in the signal COL_SAMPLE at a read port 193. In one embodiment, the internal search memory circuit 190 may be sized to store up to twenty-four blocks of samples arranged as eight blocks horizontal by three blocks vertical. Each block may be arranged as a 16×16 array of samples. Each sample may be represented by a byte of data. The internal search memory circuit 190 may be implemented in other sizes to meet the criteria of a particular application.

The circuit 192 may be referred to as an internal write control circuit. The internal write control circuit 192 may be operational to write macroblock columns presented by the external memory circuit 162 to the internal search memory circuit 190. The internal write control circuit 192 may present a write address signal (e.g., INT_ADDR_W) to the internal search memory circuit 190 to control storage of the reference samples in the signal REF_PIXEL.

The circuit 194 may be referred to as a internal read control circuit. The internal read control circuit 194 may be operational to generate a read address signal (e.g., INT_ADDR_R). The internal read control circuit 194 may sequence reads from the internal search memory 190 to generate a signal (e.g., COL_SAMPLE). The signal COL_SAMPLE may be implemented as a sequence of columns of reference samples. The signal COL_SAMPLE may be responsive to the address signal INT_ADDR_R. In one embodiment, the signal COL_SAMPLE may transfer forty-eight reference samples in parallel simultaneously.

The circuit 196 may be referred to as a shifter circuit. The shifter circuit 196 may be operational to align the reference samples received via the signal COL_SAMPLE with appropriate inputs to the circuit 198. The shifter circuit 196 may also generate pad samples to represent non-existing reference samples outside a reference frame boundary.

The circuit 198 may be referred to as a processor circuit. The processor circuit 198 may be operational to compare an array of current samples from the current block against an array of reference/pad samples to generate multiple scores substantially simultaneously, one score per current/reference sample comparison.

The circuit 200 may be referred to as an adder tree circuit. The adder tree circuit 200 may be operational to combine the multiple scores into an overall score for the comparison. Each overall score may be provided to the circuit 202.

The circuit 202 may be referred to as a mode decision tree circuit. The mode decision tree circuit 202 may be operational to determine a best score (e.g., sum of absolute difference) for the current block relative to the reference samples in the search window 106 loaded into the internal search memory circuit 190. The mode decision tree circuit 202 may also determine a best mode and one or more motion vectors associated with the best overall score.

The circuit 204 may be referred to as an original data control circuit. The original data control circuit 204 may be operational to control writes of current (original) samples into the processor circuit 198. The original data control circuit 204 may perform a re-order of the current samples from the current block prior to loading into the processor circuit 198.

The circuit 206 may be referred to as a datapath control circuit. The datapath control circuit 206 may be operational to control flow of the samples through the ME processor circuit 164. The datapath control circuit 206 may provide control signals to the internal read control circuit 194, the shifter circuit 196, the processor circuit 198, the adder tree circuit 200 and the mode decision tree circuit 202 and the original data control circuit 204.

Figure 5:
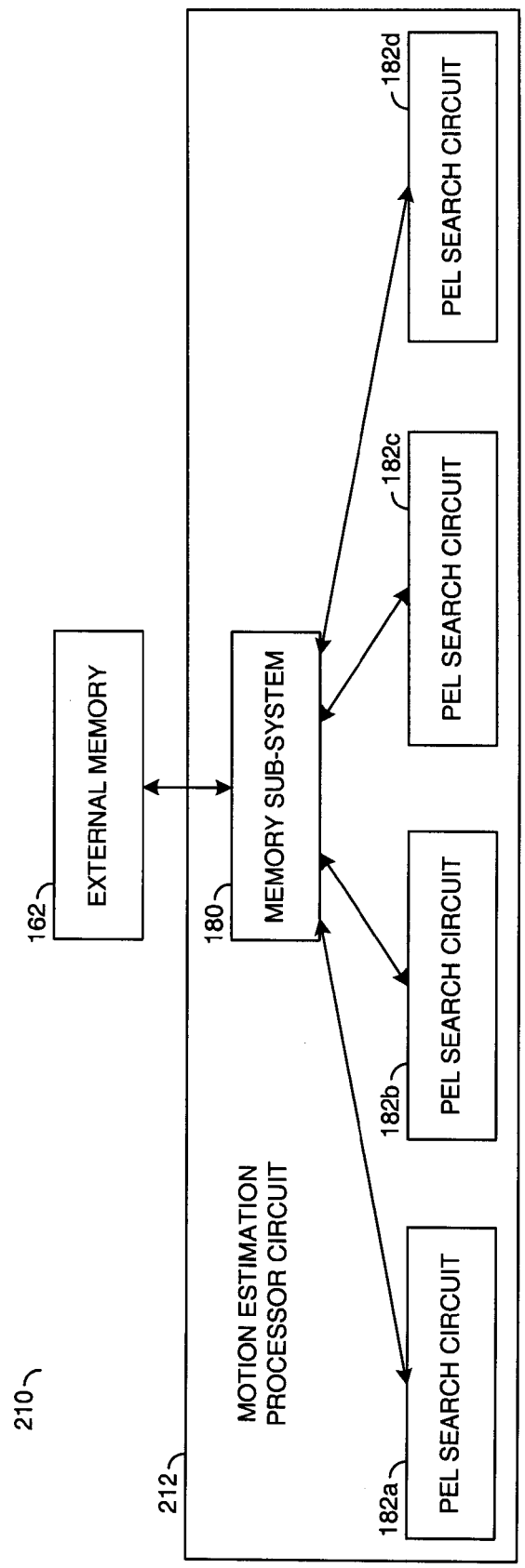
FIG. 5 is a partial block diagram of a second example implementation of an apparatus.

Referring to FIG. 5, a partial block diagram of a second example implementation of an apparatus 210 is shown. The apparatus (or system) 210 generally comprises the external memory circuit 162 and a motion estimation processor circuit 212. The motion estimation processor circuit 212 generally comprises the memory sub-system circuit 180 and multiple pel search circuits 182a-182d. Each of the pel search circuit 182a-182d may communicate with the external memory circuit 162 through the memory sub-system circuit 180.

Figure 6:
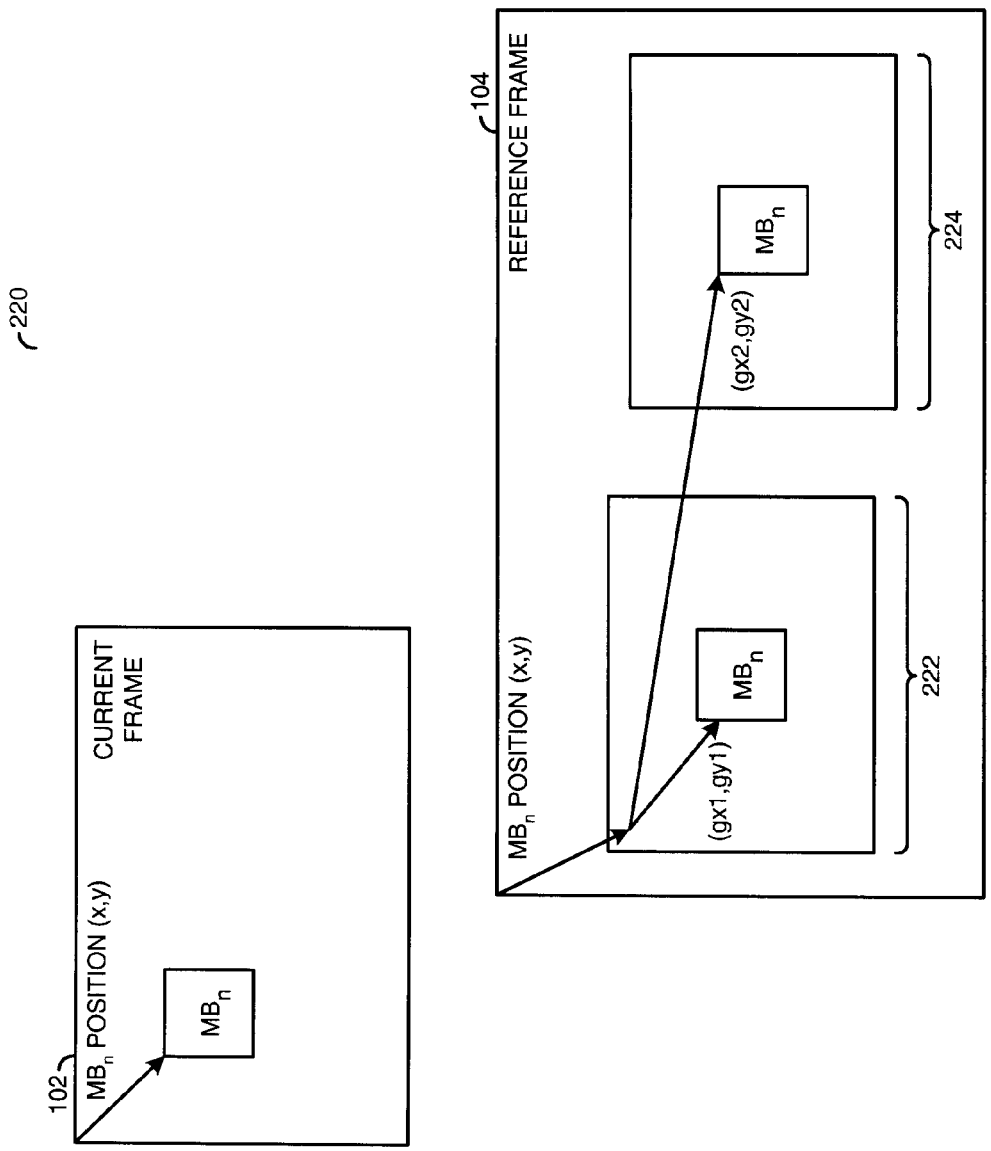
FIG. 6 is a block diagram relating an example current macroblock to two search windows.

Referring to FIG. 6, a block diagram 220 relating an example current macroblock to two search windows is shown. During motion estimation for predicted frames (e.g., P-frames), the apparatus 210 may use the pel search circuit 182a using a first global offset (e.g., (gx1, gy1)) and the pel search circuit 182b using a second global offset (e.g., (gx2, gy2)). The first global offset may define a first search window 222 spatially in the same location in the reference frame or a location near to the current block. The first search window 222 may determine a first motion vector generally associated with background or slow moving data. The second global offset may define a second search window 224 spatially distant from the current block. The second search window 224 may be determine a second motion vector generally associated with fast moving data. The pel search circuits 182a and 182b may operate together to search for a single current block at the same time, but in two different areas of the reference frame.

During a motion estimation for a bidirectional frame (e.g., B-frame), the apparatus 210 may use the pel search circuits 182a and 182b for forward prediction. The pel search circuits 182c and 182d may be used for backwards prediction. Other arrangements and uses of the pel search circuits 182a-182d may be implemented to meet the criteria of a particular application. Therefore, the apparatus 210 may search over what appears to be a large search window without (i) consuming the bandwidth of the external memory circuit 162 or (ii) the storage capacity of the internal search memory circuit 190 that would be used to actually copying the large search window.

The apparatus 100 and the apparatus 210 may each provide two small independent search windows to capture background/small motion and fast motion for high picture quality. The boxcar search window approach of the present invention generally minimizes memory bandwidth for the external memory circuit 162 and may keep data flows regular. Therefore, a complexity of the control hardware may be kept low. The global offsets may be adjustable on a per frame basis. Adjusting the global offsets generally permits the boxcar search windows to adapt to fast motions (i) within a frame of occurrence and (ii) immediately if a sub-sampled search of a current frame is used. The present invention may be adapted for use in encoders with motion estimation processors for any other digital video compression process (e.g., proprietary, Windows Media Video 9 series (Microsoft Corp., Redmond, Wash.), DivX® (Project Mayo, San Diego, Calif.), MPEG-1/2/4 (Moving Pictures Expert Group, International Organization for Standards, Geneva, Switzerland), H.261/3/4 (International Telecommunication Union Telecommunication Standardization Sector, Geneva, Switzerland)).

As used herein, the term "simultaneously" is meant to describe events that share some common time period but the term is not meant to be limited to events that begin at the same point in time, end at the same point in time, or have the same duration.

While the invention has been particularly shown and described with reference to the preferred embodiments thereof, it will be understood by those skilled in the art that various changes in form and details may be made without departing from the spirit and scope of the invention.

The invention claimed is:

1. An apparatus comprising:
a first circuit configured to (i) copy a plurality of first reference samples of a first reference image from an external memory and (ii) generate a first motion vector corresponding to a first current block of a current image by searching among said first reference samples; and
a second circuit separate from said first circuit and configured to (i) measure an offset of said current image relative to said first reference image, (ii) copy a plurality of particular reference samples of said first reference image from said external memory, said particular reference samples being (a) determined by said offset, (b) non-adjacent all of said first reference samples and (c) non-neighboring all of said first reference samples and (iii) generate a second motion vector corresponding to said first current block by searching among said particular reference samples.

2. The apparatus according to claim 1, wherein (i) said first reference samples are approximately co-located with a center of said first current block and (ii) said particular reference samples are in a different area of said first reference image than said first reference samples.

3. The apparatus according to claim 1, wherein (i) said first reference samples are based on slow moving data in said current image and (ii) said particular reference samples are based on fast moving data in said current image.

4. The apparatus according to claim 1, wherein said first circuit comprises a write control circuit configured to generate a write address to write said first reference samples to a search memory.

5. The apparatus according to claim 4, wherein said first circuit further comprises a read control circuit (i) separate from said write control circuit and (ii) configured to generate a read address to read said first reference samples from said search memory.

6. The apparatus according to claim 1, wherein said first circuit is further configured to (i) copy a plurality of second reference samples of said first reference image from said external memory and (ii) generate a third motion vector corresponding to a second current block of said current image by searching among all of (a) said second reference samples and (b) at least a first portion of said first reference samples, said second current block being horizontally adjoining said first current block in said current image.

7. The apparatus according to claim 6, wherein said second reference samples are spatially adjoining said first reference samples in said first reference image.

8. The apparatus according to claim 6, wherein generating said first motion vector and copying said second reference samples are performed in parallel.

9. The apparatus according to claim 6, wherein the first circuit is further configured to (i) overwrite some of said first reference samples with a plurality of third reference samples of said first reference image copied from said external memory and (ii) generate a fourth motion vector corresponding to a third current block of said current image by searching among all of (a) said third reference samples, (b) said second reference samples and (c) at least a second portion of said first reference samples.

10. The apparatus according to claim 1, further comprising:
a third circuit separate from both said first circuit and said second circuit and configured to (i) copy a plurality of given reference samples of a second reference image from said external memory and (ii) generate a third motion vector corresponding to said first current block by searching among said given reference samples.

11. The apparatus according to claim 1, further comprising a third circuit configured to transfer (i) said first reference samples from said external memory to said first circuit in response to a first address received from said first circuit and (ii) said particular reference samples from said external memory to said second circuit in response to a second address received from said second circuit.

12. A method to estimate motion, comprising the steps of:
(A) copying a plurality of first reference samples of a first reference image from an external memory to a first circuit;
(B) generating a first motion vector corresponding to a first current block of a current image by searching among said first reference samples;
(C) measuring an offset of said current image relative to said first reference image;
(D) copying a plurality of particular reference samples of said first reference image from said external memory to a second circuit, said second circuit being separate from said first circuit and said particular reference samples being (i) determined by said offset, (ii) non-adjacent all of said first reference samples and (iii) non-neighboring all of said first reference samples; and
(E) generating a second motion vector corresponding to said first current block by searching among said particular reference samples.

13. The method according to claim 12, wherein said first reference samples are approximately co-located with a center of said first current block.

14. The method according to claim 12, wherein (i) said first reference samples are based on slow moving data in said current image and (ii) said particular reference samples are based on fast moving data in said current image.

15. The method according to claim 12, wherein said particular reference samples are in a different area of said first reference image than said first reference samples.

16. The method according to claim 12, wherein said measuring of said offset is based on fast moving data in said current image.

17. The method according to claim 12, further comprising the steps of:
copying a plurality of second reference samples of said first reference image from said external memory to said first circuit; and
generating a third motion vector corresponding to a second current block of said current image by searching among all of (i) said second reference samples and (ii) at least a first portion of said first reference samples, said second current block being horizontally adjoining said first current block in said current image.

18. The method according to claim 17, wherein generating said first motion vector and copying said second reference samples are performed in parallel.

19. The method according to claim 17, further comprising the steps of:
overwriting some of said first reference samples with a plurality of third reference samples of said first reference image copied from said external memory to said first circuit; and
generating a fourth motion vector corresponding to a third current block of said current image by searching among all of (i) said third reference samples, (ii) said second reference samples and (iii) at least a second portion of said first reference samples.

20. The method according to claim 17, wherein said second reference samples are spatially adjoining said first reference samples in said first reference image.

21. An apparatus comprising:
means for first motion estimating configured to (i) copy a plurality of first reference samples of a first reference image from an external memory and (ii) generate a first motion vector corresponding to a first current block of a current image by searching among said first reference samples; and
means for second motion estimating configured to (i) measure an offset of said current image relative to said first reference image, (ii) copy a plurality of particular reference samples of said first reference image from said external memory, said particular reference samples being (a) determined by said offset, (b) non-adjacent all of said first reference samples and (c) non-neighboring all of said first reference samples and (iii) generate a second motion vector corresponding to said first current block by searching among said particular reference samples, wherein said means for first motion estimating is separate from said means for second motion estimating.

* * * * *